(No Model.) 3 Sheets—Sheet 1.

P. SOHÈGE.
MACHINE FOR MOLDING PAPER STUFF BOXES.

No. 511,659. Patented Dec. 26, 1893.

WITNESSES:
G. W. Rea
Jno. B. Hopper

INVENTOR:
Paul Sohège,
By James L. Norris.
Atty.

(No Model.) 3 Sheets—Sheet 2.

P. SOHÈGE.
MACHINE FOR MOLDING PAPER STUFF BOXES.

No. 511,659. Patented Dec. 26, 1893.

Witnesses:
G. W. Rea
Jno. B. Hopper

Inventor:
Paul Sohège
By James L. Norris
Atty.

(No Model.) 3 Sheets—Sheet 3.

P. SOHÈGE.
MACHINE FOR MOLDING PAPER STUFF BOXES.

No. 511,659. Patented Dec. 26, 1893.

Witnesses:
G. W. Rea.
Jno. B. Hopper.

Inventor:
Paul Sohège
By James L. Norris.
atty.

THE NATIONAL LITHOGRAPHING COMPANY,
WASHINGTON, D. C.

United States Patent Office.

PAUL SOHÈGE, OF PARIS, FRANCE.

MACHINE FOR MOLDING PAPER-STUFF BOXES.

SPECIFICATION forming part of Letters Patent No. 511,659, dated December 26, 1893.

Application filed July 21, 1893. Serial No. 481,104. (No model.)

*To all whom it may concern:*

Be it known that I, PAUL SOHÈGE, a citizen of France, and a resident of Paris, in the Department of the Seine, France, have invented a new and useful Improvement in Machines for Molding Paper-Stuff Boxes, of which the following is a specification.

This invention relates to improvements in machines, presses or apparatus employed for manufacturing boxes out of paper pulp. In manufacturing these boxes by means of this improved press wet sheets of paper pulp are wrapped round an expanding mandrel of a shape corresponding to that of the interior of the box. This material is introduced into a matrix divided into a number of sections and which is caused to contract automatically upon the mandrel by the ascent of a hydraulic piston or plunger in such a manner as to inclose the said mandrel and the pulp which it carries in a chamber or mold of a shape corresponding to that of the exterior of the box. The sides of this molding chamber may be engraved or provided with recesses or hollows capable of producing corresponding marks or designs in relief upon the external surfaces of the molded box. The mandrel is afterward expanded by hydraulic pressure of sufficient power to cause the pulp to penetrate into all the recesses in the matrix. The latter is constructed in such a manner as to admit of the escape of the water forced out of the pulp by the pressure. The boxes thus manufactured are subsequently automatically removed from the mold by the descent of the hydraulic piston and are placed upon drying mandrels heated by steam or otherwise on which the hardening of the pulp is completed.

In order that this invention may be fully understood I shall now proceed more particularly to describe the same and for that purpose shall refer to the several figures on the annexed sheet of drawings the same numerals of reference indicating corresponding parts in all the figures.

Figure 1:
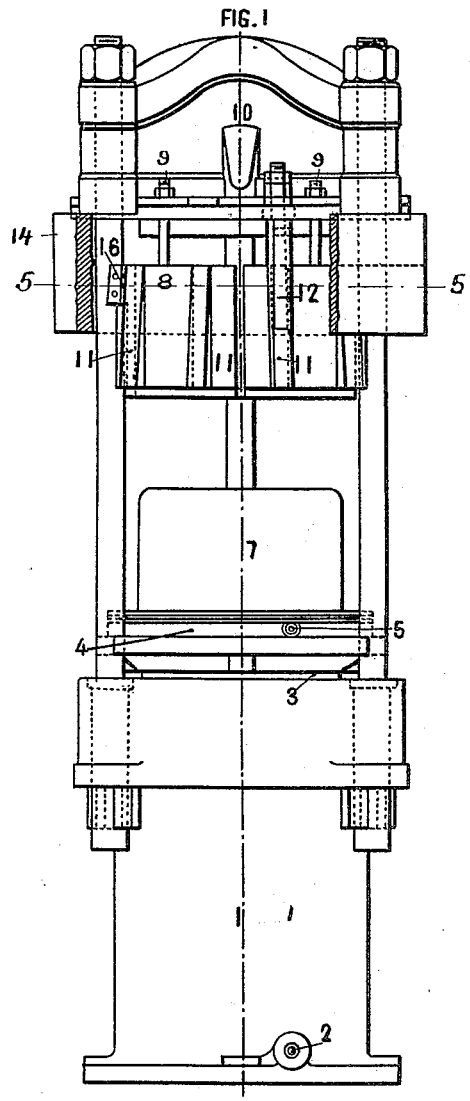
Figure 6:
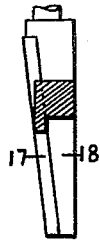
Figure 2:
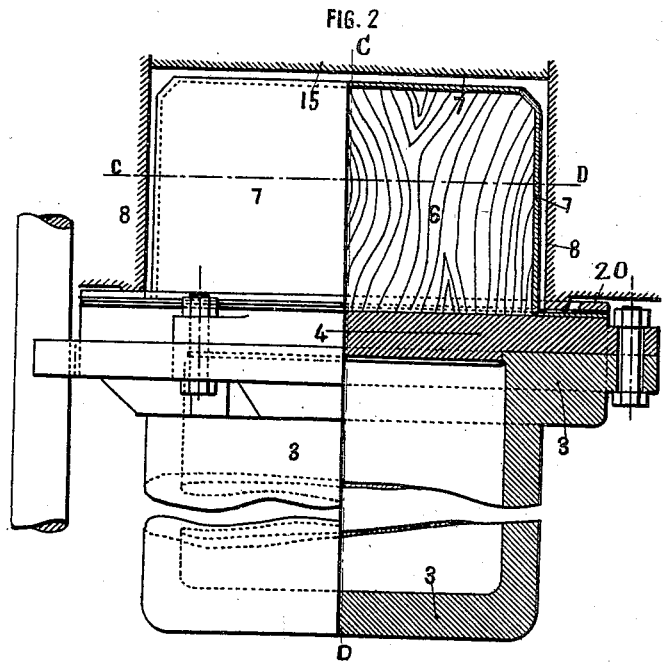
Figure 3:
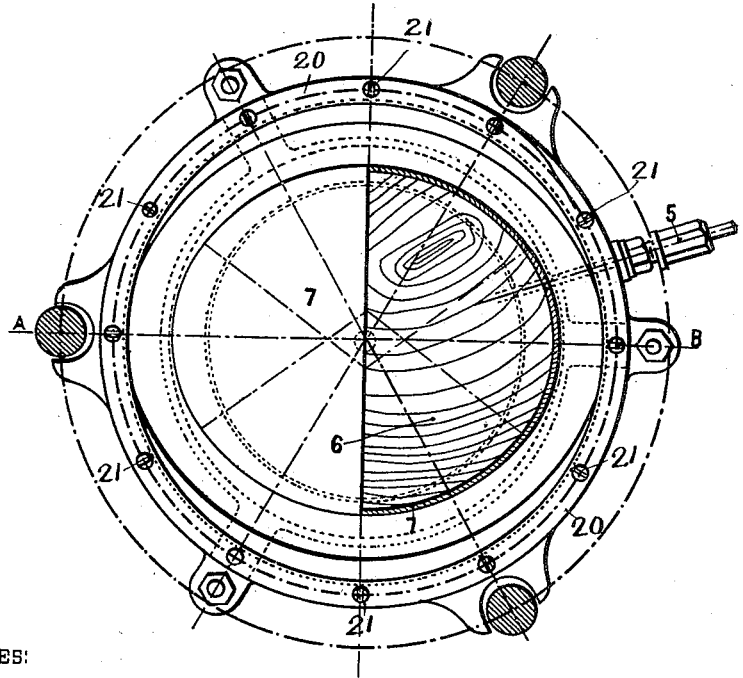
Figure 4:
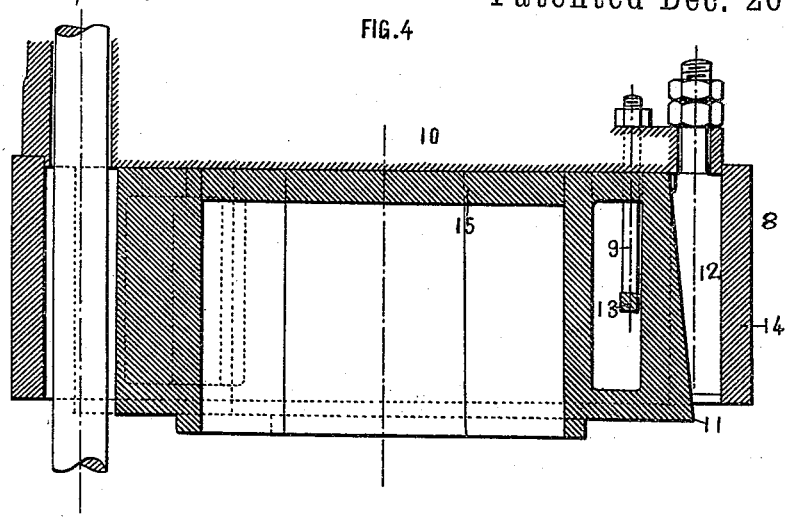
Figure 5:
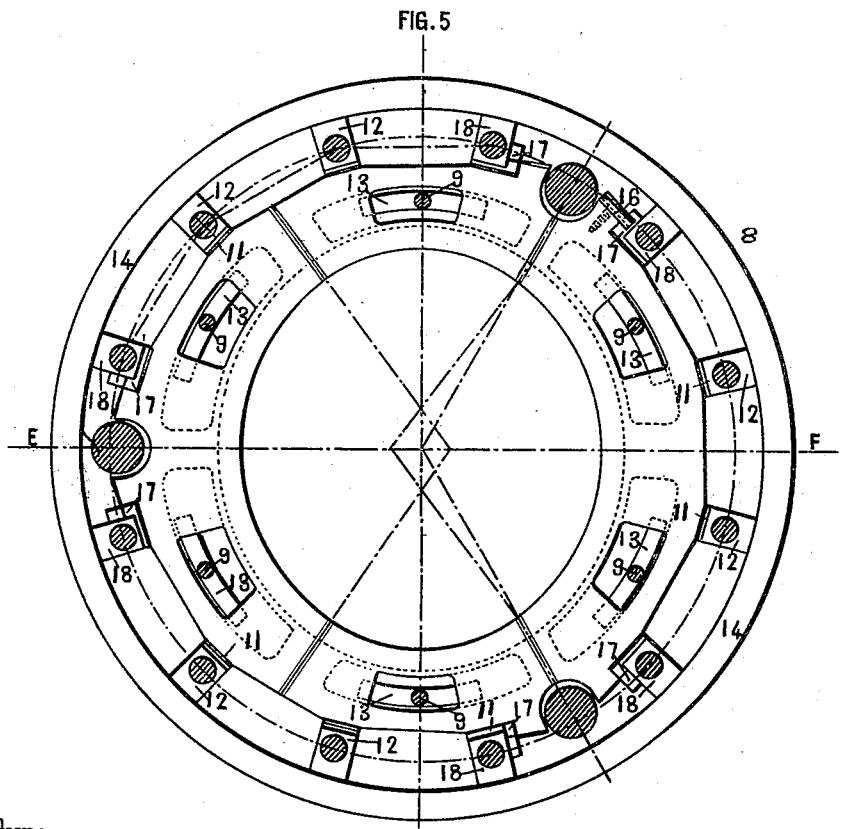

Figure 1 of the accompanying drawings represents in side elevation and partly in vertical section an example of a press or apparatus constructed according to this invention. Fig. 2 drawn to a larger scale illustrates the hydraulic piston or plunger and the mandrel employed in the said press the left hand part of the figure being represented in elevation and the right hand part in vertical section on the line A—B Fig. 3. Fig. 3 represents the mandrel in plan the right hand part of the figure being in section on the line C—D Fig. 2. Fig. 4 represents the matrix in vertical section on the line E F Fig. 5. Fig. 5 represents the matrix and parts connected therewith in plan and partly in horizontal section on the line 5—5, Fig. 1. Fig. 6 illustrates in detail a wedging device employed in connection with the matrix as hereinafter explained.

The machine is constructed with a hydraulic press 1, Fig. 1, supplied with water through a pipe 2 and containing a piston or plunger 3 attached to the under side of a plate 4 connected to a pipe 5 through which water is supplied to a passage leading to an orifice at the center of the plate. Upon the plate 4 is fixed a mandrel 6 the external shape and dimensions of which correspond with those of the interior of the box to be produced being somewhat smaller than the latter in all directions. A rubber cap or cover 7 is placed upon the mandrel 6. The edges of this cover are secured to the plate 4 by a ring 20 and screws 21 Figs. 2 and 3. When water is supplied under pressure through the pipe 5 it is caused to enter the space between the mandrel 6 and the rubber cover 7 and causes the said cover to expand.

Owing to the small amount of elasticity possessed by paper pulp it is necessary to limit its extension at the time of molding. The improved press complies with this condition by means of the peculiar arrangement of the matrix 8 which as indicated in Fig. 5 is made in sections divided radially so as to be capable of separating or opening at the time when the matrix is being placed over the pulp upon the mandrel but which can be moved toward one another or inwardly so as to press or bear upon the said pulp in all directions before the rubber is expanded. The parts or sections composing the matrix 8 are suspended from the head 10 of the press by bolts or rods 9 and are provided externally with inclined bearing surfaces 11 which slide upon, or against wedges 12 and force the sections inward so as to produce the pressure when the sections ascend the said sections being moved apart or separated when they descend by the action of inclines 17 provided or mounted upon certain of the wedge blocks 12, said inclines being adapted to act on projections 16 attached to the sections of the matrix as represented in Figs. 5 and 6.

Fig. 4 illustrates in section the arrangement of the matrix 8 with one of the supporting rods 9 mounted on the press-head 10 and provided with a head 13 which limits the downward movement of the matrix. The wedges 12 are supported by a hoop or ring 14 surrounding the sections of the matrix and forming a bearing or support for retaining the wedges 12 in position when they are acted upon by the hydraulic pressure causing the expansion of the cover 7 of the mandrel.

In order to mold a box, the exterior of the rubber cover 7 of the mandrel 6 is first covered with a layer of paper pulp of suitable thickness. The operation of molding is performed by forcing the external surface of the pulp against the interior surface of the matrix 8, which is of a shape corresponding with that of the outer face of the box, the operation being completed by expanding the rubber cover 7 of the mandrel 6 by means of hydraulic pressure. When the piston or plunger 3 ascends the rubber cover 7 covered with the layer of pulp is introduced between the separated segments or sections of the matrix 8 as represented in Fig. 2 until the lower edges of the matrix press upon the edge or flange of the rubber cover 7 fixed upon the plate 4. As the piston or plunger 3 continues to ascend the sections of the matrix are now elevated and forced inward by the wedges 12 until their upper edges bear against the head 10 of the press, said parts being shown in this position in Fig. 4. When the parts are in this position the paper pulp is completely inclosed and supported in all directions. The upper end of the matrix is closed by a plate 15 Fig. 4 and this plate as well as the sides of the matrix is perforated with orifices and passages not shown in the drawings for the escape of the water exuding from the pulp the surfaces in contact with the latter being covered with a finely perforated sheet of metal. The hydraulic pressure exerted underneath the piston or plunger 3 being maintained the lower edges of the matrix are forcibly pressed against the rubber and make a tight joint with the plate 4. The hydraulic pressure is then caused to act at the back of or in the interior of the rubber cover 7 the water being supplied through the pipe 5. This cover then expands and drives out a portion of the water contained in the pulp and molds or forms the card or paper box which is pressed against the contracted sides of the matrix. The water in the interior of the rubber cover 7 is then drawn off through the pipe 5. This cover then contracts and bears upon the mandrel 6. A space or interval is thus formed between the external surface of this cover and the internal surface of the molded box. The plunger of the press being now allowed to descend the matrix is lowered along with the plate 4 until its movement is arrested by the heads 13 on the rods 9 Fig. 4 and at the same time the sections are separated and moved outward by the action of the projections 16 attached by screws to the exterior of the sections of the matrix and engaging with the guides or inclines 17 provided upon certain of the wedge blocks 12 Fig. 5 as hereinbefore explained. The expansion of the matrix frees the molded box so that it remains suspended in an inverted position upon the rubber cover and descends with the latter until the piston has completed its descent as represented in Fig. 1. The box can then be removed as its internal dimensions are greater than the external dimensions of the cover 7 which is now in the contracted position.

The shapes, dimensions, proportions and materials mentioned in the foregoing description or illustrated by way of example in the annexed drawings may evidently be modified without affecting the principle of the invention.

I claim—

1. In an apparatus for molding boxes from paper pulp, the combination with a mandrel having a covering of rubber, of a piston or plunger to raise and lower said mandrel, a matrix having a plurality of separable parts suspended from the press-head and capable of a limited vertical movement, each of the parts being provided with inclined surfaces, a series of wedges adapted to act upon said inclined surfaces as the parts of the matrix move upward, a pipe communicating with the press-body, a pipe communicating with the space between the mandrel and its rubber cover, and a source of hydraulic pressure supplying said pipes, substantially as described.

2. In an apparatus for molding boxes from paper pulp, the combination with a mandrel having a covering of rubber, of a piston or plunger to raise and lower said mandrel, a matrix composed of a plurality of separable parts suspended from the press-head and capable of a limited vertical movement, each of said parts being provided with inclined surfaces and projections, a series of wedges adapted to act upon said inclined surfaces as the matrix rises to force its parts together, a series of inclines upon certain of said wedges to act upon the projections on the parts of the matrix and separate the same as the matrix descends, a source of hydraulic pressure, and pipes connecting the same with the press-body and with the space between the mandrel and its covering of rubber, substantially as described.

3. In an apparatus for molding boxes from paper pulp, the combination with a mandrel having a covering of rubber, of a piston or plunger to raise and lower said mandrel, a matrix composed of a plurality of separable parts suspended from the press-head and capable of a limited vertical movement, each of said parts being provided with inclined surfaces and projections, a series of wedges adapted to act upon said inclined surfaces as the matrix rises and closes the parts of the same, an external ring to support said wedges, a series of inclines upon certain of the latter to act upon the projections on the parts of the matrix and separate the latter as the matrix descends, a source of hydraulic pressure, and pipes connecting the same with the press-body and with the space between the mandrel and its rubber covering, substantially as described.

In testimony whereof I have signed this specification in the presence of two subscribing witnesses.

PAUL SOHÈGE.

Witnesses:
    MIS DE SPINOSA,
    N. JON.